United States Patent [19]

Nishizaki et al.

[11] 4,402,915
[45] Sep. 6, 1983

[54] METAL HYDRIDE REACTOR

[75] Inventors: Tomoyoshi Nishizaki, Suita; Kanzi Oguma, Higashimurayama; Katsuyoshi Sakagami, Osaka; Ken Yoshida, Ibaragi, all of Japan

[73] Assignee: Sekisui Kagaku Kogyo Kabushiki Kaisha, Osaka, Japan

[21] Appl. No.: 259,051

[22] Filed: Apr. 30, 1981

[51] Int. Cl.³ .............................................. F28D 7/00
[52] U.S. Cl. ...................................... 422/202; 62/48; 165/104.12; 165/DIG. 17; 422/209; 422/239
[58] Field of Search ................... 422/202, 209, 239; 165/1, 104.12, DIG. 17; 261/104; 62/48

[56] References Cited

U.S. PATENT DOCUMENTS

| | | | |
|---|---|---|---|
| 2,138,861 | 12/1938 | Hyman | 422/209 |
| 2,337,956 | 12/1943 | Yerrick et al. | 422/209 X |
| 2,531,657 | 11/1950 | Tobler, Jr. | 422/239 |
| 2,704,242 | 3/1955 | Strauss | 422/239 X |
| 3,075,361 | 1/1963 | Lindberg, Jr. | 165/104.12 |
| 3,156,536 | 11/1964 | Desbois | 422/209 |
| 3,833,016 | 9/1974 | Lucero et al. | 261/104 X |
| 4,022,581 | 5/1977 | Rudorfer et al. | 422/239 |
| 4,040,410 | 8/1977 | Libowitz | 165/104.12 X |
| 4,101,294 | 7/1978 | Kimura | 261/104 X |
| 4,200,144 | 4/1980 | Sirovich | 165/104.12 X |
| 4,270,360 | 6/1981 | Nakane et al. | 165/104.12 X |
| 4,330,084 | 5/1982 | Buchner et al. | 165/DIG. 17 |

FOREIGN PATENT DOCUMENTS 51-22151 2/1976 Japan .

Primary Examiner—Richard L. Chiesa
Attorney, Agent, or Firm—Wenderoth, Lind & Ponack

[57] ABSTRACT

A metal hydride reactor including at least one sealed chamber, the chamber being divided into two compartments by a partitioning wall made of a material permeable to hydrogen gas but impermeable to metal hydrides, the compartments containing different metal hydrides. In one embodiment, the metal hydride reactor including a sealed vessel rotatable about a central shaft, the vessel being divided into a plurality of sealed chambers by at least one sealing wall along a plane containing the central shaft and extending diametrically thereof, each of the sealed chambers being divided into two compartments by a partitioning wall made of a material permeable to hydrogen gas but impermeable to metal hydrides, the compartments containing different metal hydrides, and each of the compartments having a heat conducting surface facing exteriorly thereof.

27 Claims, 33 Drawing Figures

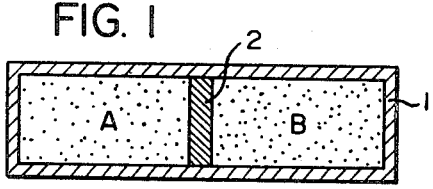
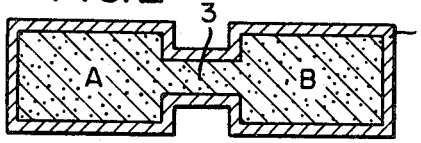
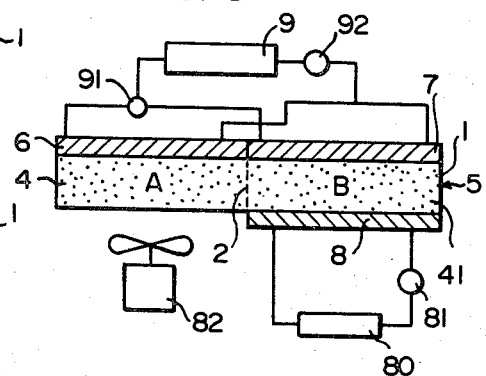
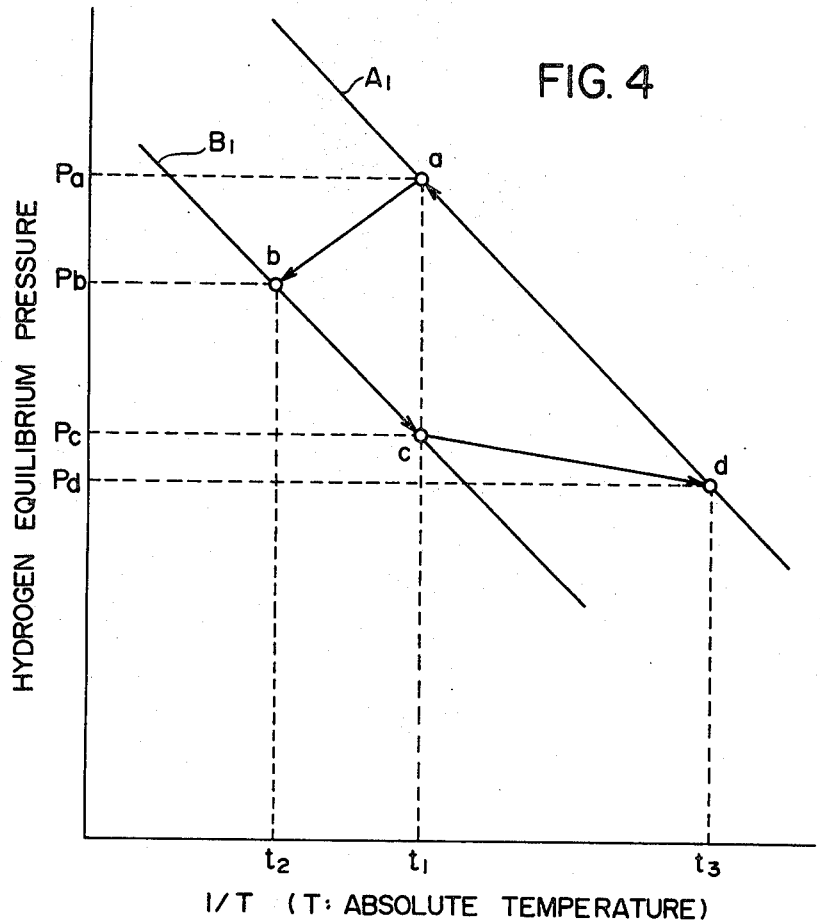

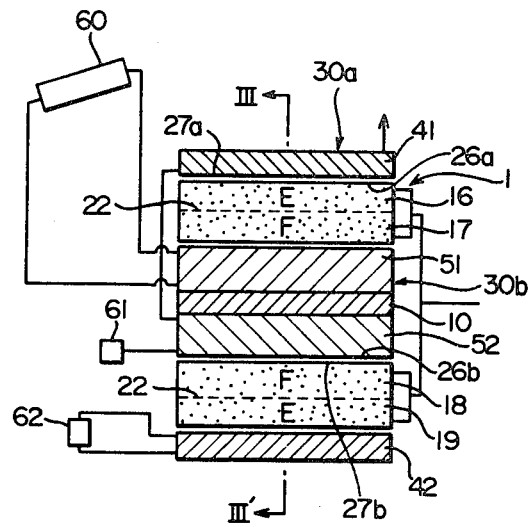
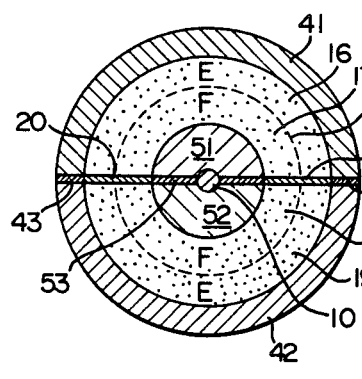
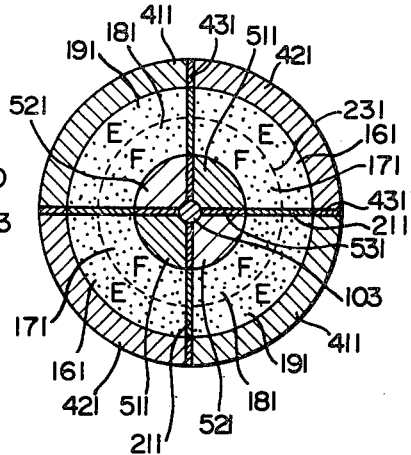

METAL HYDRIDE REACTOR

BACKGROUND OF THE INVENTION

1. Field of the Invention

This invention relates to a metal hydride reactor which makes use of endothermic and exothermic reactions of metal hydrides.

2. Description of the Prior Art

It has been known that many metals or alloys (to be referred to simply as metals) reversibly react with hydrogen in accordance with the following scheme $$[MH] + Q \rightleftharpoons [M] + H_2 \uparrow$$

wherein M represents a metal, and Q is the amount of heat generated, and generate heat during absorption of hydrogen and absorb heat during releasing of hydrogen. It is also known that since these metals have their own hydrogen equilibrium pressure characteristics, a combination of two metals having different hydrogen equilibrium pressure characteristics can be used in cooling and heating systems. For example, it was suggested to use two metals having different hydrogen equilibrium pressure characteristics in air-conditioning applications by putting them in different receptacles and connecting the two receptacles by a pipe through a valve, an electromagnetic valve or similar element. Such a device, however, has various defects. For example, because the receptacles are connected to each other by a pipe through a valve, an electromagnetic valve or similar element, its pressure resistance is poor. The ability of this device to seal up hydrogen gas is not sufficient, and it may invoke a danger of hydrogen leakage or a large pressure loss of hydrogen. Moreover, it is difficult to build this device in a continuous air-conditioning system or similar system.

Japanese Laid-Open Patent Publication No. 22151/1976 discloses an air-conditioning system comprising two sets of cooling-heating blocks each consisting of two communicating receptacles containing metal hydrides, each receptacle including a heater and a cooler. In operation, one of the receptacles in each set is alternately heated and cooled so that the other receptacle is utilized alternately as a cooling source and a heating source. Although this system does not use a pump or a compressor, it is complex in structure and difficult to maintain, and moreover, its heat efficiency is low. Hence, this system is unsuitable for continuous operation.

OBJECTS OF THE INVENTION

It is an object of this invention therefore to provide a metal hydride reactor which is relatively simple in structure and easy to maintain, and which by continuous operation, can be used as a cooling and heating system.

Another object of this invention is to provide a metal hydride reactor having excellent hydrogen sealability and high pressure resistance and which is very safe.

Still another object of this invention is to provide a metal hydride reactor in which reactions occur with high efficiency because of a reduced pressure loss of hydrogen gas and good thermal conductivity.

BRIEF SUMMARY OF THE INVENTION

The present invention provides a metal hydride reactor comprising at least one sealed chamber, the chamber being divided into two compartments by a partitioning wall made of a material permeable to hydrogen gas but impermeable to metal hydrides, the compartments containing different metal hydrides.

In another aspect, the present invention provides a metal hydride reactor comprising a sealed vessel rotatable about a central shaft, the vessel being divided into a plurality of sealed chambers by at least one sealing wall along a plane containing the central shaft and extending diametrically thereof, each of the sealed chambers being divided into two compartments by a partitioning wall made of a material permeable to hydrogen gas but impermeable to metal hydrides, the compartments containing different metal hydrides, and each of the compartments having a heat conducting surface facing exteriorly.

Metal hydrides which can be used in this invention are hydrides of metals which react with hydrogen reversibly and exothermically, for example hydrides of combinations of metals such as alkali metals, alkaline earth metals, lanthanoids, actinoids and transition metals. Specific examples include lanthanum nickel hydride ($LaNi_5\text{-}H_x$), calcium nickel hydride ($CaNi_5\text{-}H_x$), mischmetal nickel hydride ($MmNi_5\text{-}H_5$), mischmetal cobalt hydride ($M_mCo_5\text{-}H_x$), neodymium cobalt hydride ($NdCO_5\text{-}H_x$), iron titanium hydride ($FeTi\text{-}H_x$), vanadium niobium hydride ($VNn\text{-}H_x$), magnesium nickel hydride ($Mg_2Ni\text{-}H_x$) and magnesium copper hydride ($Mg_2Cu\text{-}H_x$).

In sealing these metal hydrides in metal hydride reactors, they may be used in suitable combinations, such as lanthanum nickel hydride/calcium nickel hydride, mischmetal nickel hydride/lanthanum nickel hydride, mischmetal cobalt hydride/lanthanum nickel hydride, vanadium niobium hydride/mischmetal cobalt hydride, and iron titanium hydride/neodymium cobalt hydride.

These metal hydrides can be produced by known methods. For example, such a metal hydride can be obtained by mixing powders of metals in such proportions as to provide a predetermined alloy composition, press-forming the mixture into a desired shape, heat-melting the molded mixture in a known arc melting furnace in an inert atmosphere, cooling the molten mass to form an alloy of the predetermined composition, filling a powder of the resulting alloy into a suitable vessel, introducing hydrogen into the vessel at room temperature, and applying a hydrogen pressure of, for example, about 50 kg/cm$^2$.

These metal hydrides can also be easily obtained commercially. For example, metal hydrides under the tradename "HY-STOR" are sold by MPD Technology Corporation, U.S.A.

The material which constitutes the sealed vessel used in this invention must be impermeable to hydrogen gas, and also should have excellent pressure resistance and hydrogen embrittlement resistance. Furthermore, at least that part of the material which is used as a vessel wall constituting a heat conducting surface should desirably have good heat conductivity. For example, stainless steel, aluminum, aluminum alloys, and copper are used as such a material, and stainless steel is especially preferred.

A porous plate-like material or film-like material can be used as the partitioning wall which is permeable to hydrogen gas but impermeable to metal hydrides. These materials preferably have excellent heat resistance, heat insulation and mechanical strength. Specific examples of such materials are sintered metal bodies, porous polymeric materials, nonwoven fabrics, glass fiber mats and metallic meshes, either alone or as laminates. A sintered body of stainless steel is especially preferred. In order not to permit passage of a metal hydride powder, the porous material preferably has a diameter of about several microns. When a sintered stainless steel body is used, the thickness of the partitioning wall is preferably 2 to 5 mm.

It is also possible to fix the metal hydride powder by a binder such as natural rubber, polypropylene, polyethylene, cellulose triacetate, a polyester, an epoxy resin, or a silicone resin and simultaneously to constitute the partitioning wall by the binder. The fixed metal hydride needs to be porous so as to be able to contact hydrogen gas. Such a porous metal hydride can be obtained by fixing the metal hydride powder using the above binder in an amount of 0.1 to 10 parts by weight per 100 parts by weight of the metal hydride.

DESCRIPTION OF THE DRAWINGS

The present invention is described in greater detail below with reference to the accompanying drawings in which:

FIG. 1 is a sectional view showing one embodiment of the metal hydride reactor of the invention;

FIG. 2 is a sectional view showing another embodiment of the metal hydride reactor of the invention;

FIG. 3 is a view illustrating a method of heating by means of the metal hydride reactor of the invention;

FIG. 4 is a graphic representation showing the hydrogen equilibrium characteristics of metal hydrides;

FIG. 12 is a sectional view showing a different embodiment of a system for cooling by means of the metal hydride reactor of the invention;

FIG. 13(a) is a sectional view taken along line III-III' of FIG. 12;

FIG. 13(b) is a sectional view showing a different embodiment taken along line III-III' of FIG. 12;

DETAILED DESCRIPTION OF THE PREFERRED EMBODIMENTS

Figure 5:
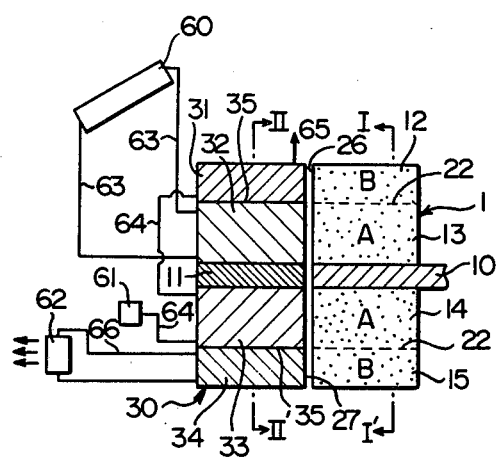
FIG. 5 is a sectional view showing one embodiment of a system for cooling by means of the metal hydride reactor of the invention.

Referring to FIG. 1, a rectangular sealed vessel 1 is divided into two compartments by means of a plate-like partitioning wall 2, and metal hydrides A and B are put in the respective compartments.

In FIG. 2, the sealed vessel 1 is narrowed at its central portion, and the metal hydrides A and B in separate compartments are fixed by a porous member permitting passage of hydrogen gas using a binder 3 which constitutes a partitioning wall.

FIG. 3 is a view for illustrating a method for using the metal hydride reactor shown in FIG. 1 for heating. In FIG. 3, the reference numeral 5 represents a metal hydride reactor in which a vessel 1 is divided into compartments 4 and 41 by means of a partitioning wall 2. The compartment 4 contains a metal hydride A, and the other compartment 41 contains a metal hydride B. Heat-exchangers 6 and 7 connected to a solar heat collector 9 are provided on the surfaces of the compartments 4 and 41 on one side thereof. Opposite to the other surface of the compartment 4 is disposed a fan 82, and a heat exchanger 8 is provided opposite to the other surface of the compartment 41. The heat exchanger 8 is connected to a radiator 80 through a pump 81. A heat transfer medium is supplied to the heat exchangers 6, 7 and 8.

FIG. 4 is a graph showing the hydrogen equilibrium pressure characteristics of the metal hydrides A and B, in which the ordinate represents hydrogen equilibrium pressures as logarithms and the abscissa, temperatures as reciprocals of absolute temperatures T.

In performing heating by the system shown in FIG. 3, a heat transfer medium heated to a temperature $t_1$ by the solar heat collector 9 is supplied to the heat exchanger 6 by means of a pump 92 to heat the metal hydride A. The metal hydride A has a hydrogen equilibrium pressure of $P_a$ (FIG. 4) at temperature $t_1$. Since at this time the temperature of the metal hydride B is lower than the temperature $t_1$, the hydrogen equilibrium pressure of the metal hydride B is lower than $P_a$. Thus, hydrogen released from the metal hydride A is absorbed by the metal hydride B through the partitioning wall 2. Upon absorption of hydrogen, the metal hydride B generates heat, and reacts such that the hydrogen equilibrium pressure $P_b$ of the metal hydride B is in equilibrium with the hydrogen equilibrium pressure $P_a$ of the metal hydride A. Hence, the temperature $t_2$ of the metal hydride B which has generated heat becomes higher than $t_1$. As a result, the heat transfer medium in the heat exchanger 8 is heated to a temperature higher than $t_1$ by the heat generated from the metal hydride B. The heated heat transfer medium is sent to the radiator by means of a pump 81 for heating. When hydrogen from the metal hydride A has been absorbed by the metal hydride B almost completely and the metal hydride B substantially ceases to generate heat, a three-way cock 91 is switched over so as to supply a heat transfer medium heated to temperature $t_1$ to the heat exchanger 7 thereby cooling the metal hydride B. Simultaneously, the metal hydride A is cooled to the ambient temperature $t_3$ (lower than $t_1$) by means of the fan 82. Consequently, the hydrogen equilibrium pressure $P_c$ of the metal hydride B becomes higher than the hydrogen equilibrium pressure $P_d$ of the metal hydride A, and therefore, hydrogen is released from the metal hydride B and absorbed by the metal hydride A. After completion of this reaction, the metal hydride A is again heated, and the heat generated from the metal hydride B can be used again for heating.

In this way, one cycle of heating is performed. During the reaction of each of the metal hydrides with hydrogen, only the heat of the reaction generated between a and b in FIG. 4 is utilized, and no heat is utilized between c and d. In actual practice, therefore, it is desirable to provide at least two reaction vessels as described hereinbelow and operate them alternatively so as to perform heating continuously.

The metal hydride reactor in accordance with the above embodiment of this invention can also be used for cooling by selecting suitable metal hydrides and using a fan in place of the heat exchanger 7.

Figures 6A, 6B:
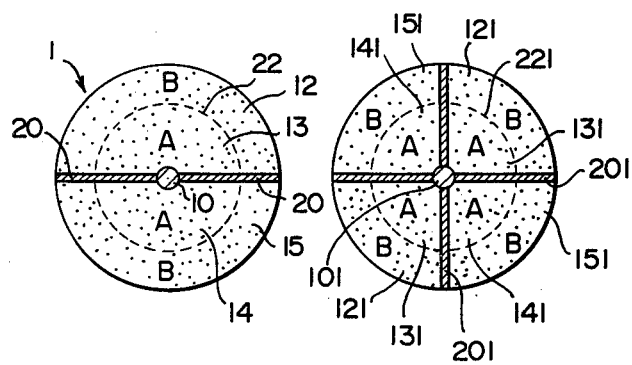
FIG. 6(a) is a sectional view taken on line I-I' of FIG. 5.
FIG. 6(b) is a sectional view showing a different embodiment taken along line I-I' of FIG. 5.
Figures 7A, 7B:
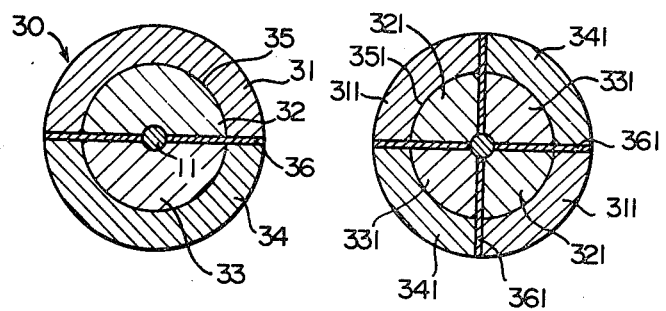
FIG. 7(a) is a sectional view taken along line II-II' of FIG. 5.
FIG. 7(b) is a sectional view showing a different embodiment taken along line II-II' of FIG. 5.

FIGS. 5, 6(a) and 7(a) show one embodiment of the metal hydride reactor of the invention used for cooling. A sealed vessel 1 is rotatably provided around a shaft 10. The vessel 1 is cylindrical around the shaft 10 as a center, and is divided into two sealed chambers by means of a sealing wall 20 provided diametrically of the cylinder. Each of the sealed chambers is divided into two compartment by means of a partitioning wall 22 provided concentrically with the outside wall of the cylindrical vessel 1. The partitioning wall 22 is permeable to hydrogen gas but impermeable to metal hydrides. Thus, the sealed vessel 1 is divided into compartments 12, 13, 14 and 15 by the sealing wall 20 and the partitioning wall 22. A metal hydride B is put in the compartments 12 and 15 located outwardly of the partitioning wall 22, and a metal hydride A different from the metal hydride B is put in the compartments 13 and 14 located inwardly of the partitioning wall 22. The central shaft 10 is connected to a drive system (not shown) so as to be rotatable. One outer wall 26 perpendicular to the central shaft 10 forms a heat conducting surface for the compartments 12, 13, 14 and 15.

In FIGS. 5 and 7(a), the reference numeral 30 is a fixed heat exchanger. The heat exchanger 30 is divided into four heat-exchanging chambers 31, 32, 33 and 34 by being divided by a cylindrical inner wall 35 around a shaft 11 extending from the shaft 10 and a flat plate-like inner wall 36 including the shaft 11. The sectional shapes of the heat exchanging chambers 31 and 34 correspond to those of the compartments 12 and 15 of the sealed vessel 1, and the sectional shapes of the heat exchanging chambers 32 and 33 correspond to those of the compartments 13 and 14 of the sealed vessel 1. The reference numeral 27 represents a heat exchanging surface which faces the heat conducting surface 26 of the sealed vessel 1 in proximity thereto. It will be readily appreciated that in the initial state, the compartment 12 faces the heat exchanging chamber 31, the compartment 13 faces the heat exchanging chamber 32, the compartment 14 faces the heat exchanging chamber 33, and the compartment 15 faces the heat exchanging chamber 34, and by rotating the sealed vessel 1 through 180 degrees, the above relative positions change.

A solar heat collector 60 is connected to the heat exchanging chamber 32 by means of a pipe 63 so that a heat transfer medium can be circulated between them. A blower 61 is connected to the heat exchanging chambers 31 and 33 by means of a pipe 64 such that the atmospheric air passes through the heat exchange chambers 31 and 33 and discharged from a discharge opening 65 provided in the heat exchanging chamber 31. A radiator 62 is connected to the heat exchanging chamber 34 by means of a pipe 66 so that a heat transfer medium circulates between it and the heat exchanging chamber 34.

Figure 10:
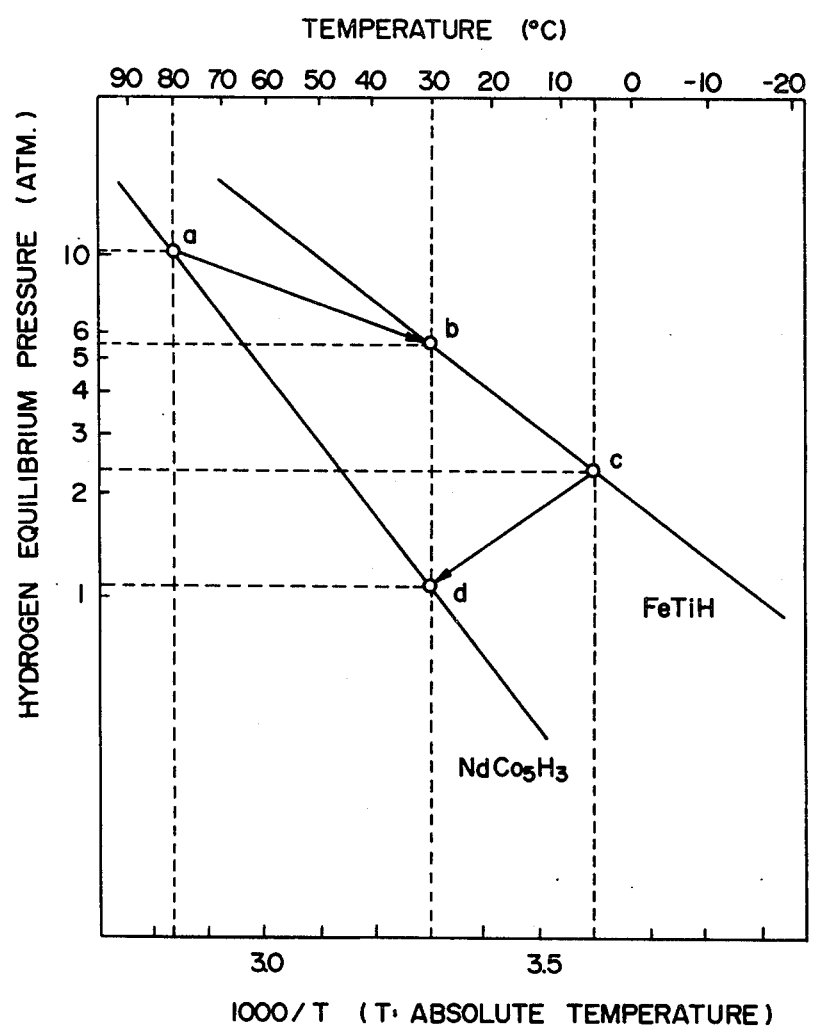
FIG. 10 is a graphic representation showing the hydrogen equilibrium pressures of iron titanium hydride (FeTiH) and neodymium cobalt hydride (NdCo$_5$H$_3$) as a function of temperature.

The above system is used for cooling by the following method. Neodymium cobalt hydride as the metal hydride A and iron titanium hydride as the metal hydride B are sealed in the respective compartments of the sealed vessel 1. The hydrogen equilibrium pressures of iron titanium hydride (FeTiH) and neodymium cobalt hydride ($NaCo_5H_3$) as functions of temperature are shown in FIG. 10. Let us suppose that the heat transfer medium is heated to 80° C. by the heat collected by the solar heat collector 60 and the temperature of the atmospheric air is 30° C. The heat transfer medium heated by the solar heat collector 60 is circulated between the collector 60 and the heat exchanging chamber 32. The heat of the heat transfer medium is transmitted to the compartment 13 to heat the neodymium cobalt hydride. Atmospheric air is supplied to the heat exchanging chamber 31 by means of the blower 61 to maintain the heat exchanging chamber 31 at 30° C. The heat is transmitted to the compartment 12 to maintain the iron titanium hydride at 30° C. When the neodymium cobalt hydride is maintained at 80° C. (point a in FIG. 10), the hydrogen equilibrium pressure of the neodymium cobalt hydride is about 10 atmospheres, and when the iron titanium hydride is maintained at 30° C., (point b in FIG. 10), the hydrogen equilibrium pressure of the iron titanium hydroride is about 5.5 atmospheres. Accordingly, the neodymium cobalt hydride releases hydrogen gas and the iron titanium hydride absorbs hydrogen gas. In other words, the reaction a→b proceeds between the compartments 13 and 12. When the reaction a→b substantially ends, the sealed vessel 1 is rotated through 180° by the central shaft 10, with the result that the compartment 12 faces the heat exchanging chamber 34 and the compartment 13 faces the heat exchanging chamber 33. The atmospheric air is supplied to the heat exchanging chamber 33 by means of the blower 61 and maintained at 30° C., and the neodymium cobalt hydride in the compartment 13 is cooled to 30° C. (point a in FIG. 10). Upon cooling, the neodymium cobalt hydride has a hydrogen equilibrium pressure of about 1.2 atmospheres which is lower than the hydrogen equilibrium pressure of the iron titanium hydride in the compartment 12. Thus, the iron titanium hydride releases hydrogen gas, and this hydrogen gas is absorbed by the neodymium cobalt hydride. Upon releasing the hydrogen gas, the iron titanium hydride absorbs heat, and is cooled toward b→c. A steady state is reached, for example at 5° C. (c), and the reaction in the direction c→d proceeds. Since at this time the compartment 12 is cooled to 5° C., the heat transfer medium in the heat exchanging chamber 34 which faces the compartment 12 is cooled. The cooled heat transfer medium is circulated to the radiator 62 and used for cooling. When the reaction c→d is substantially over, the sealed vessel 1 is again rotated through 180°, and the iron titanium hydride in the compartment 12 begins to react again with the neodymium cobalt hydride in the compartment 13 in the direction of a→b.

The sealed vessel 1 includes the compartments 12 and 15 containing the iron titanium hydride and the compartments 13 and 14 containing the neodymium cobalt hydride with a sealing wall 20 as a symmetrical surface. While the reaction a→b proceeds between the compartments 12 and 13, the reaction c→d proceeds between the compartments 14 and 15. Conversely, while the reaction c→d proceeds between the compartments 12 and 13, the reaction a→b proceeds between the compartments 14 and 15. Accordingly, the reaction between the neodymium cobalt hydride and the iron titanium hydride is prescribed such that it proceeds through one cycle of a→b→c→d during 180° rotation of the sealed vessel 1. Since the compartment 12 or 15 of the sealed vessel 1 facing the heat exchanging chamber 34 is always cooled, continuous cooling can be performed.

Figure 8:
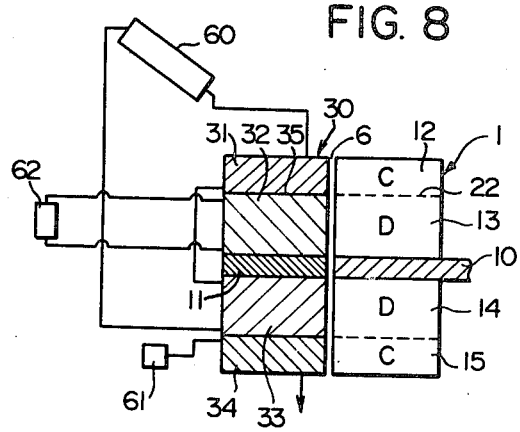
FIG. 8 is a sectional view showing one embodiment of a system for heating by means of the metal hydride reactor of the invention.
Figure 11:
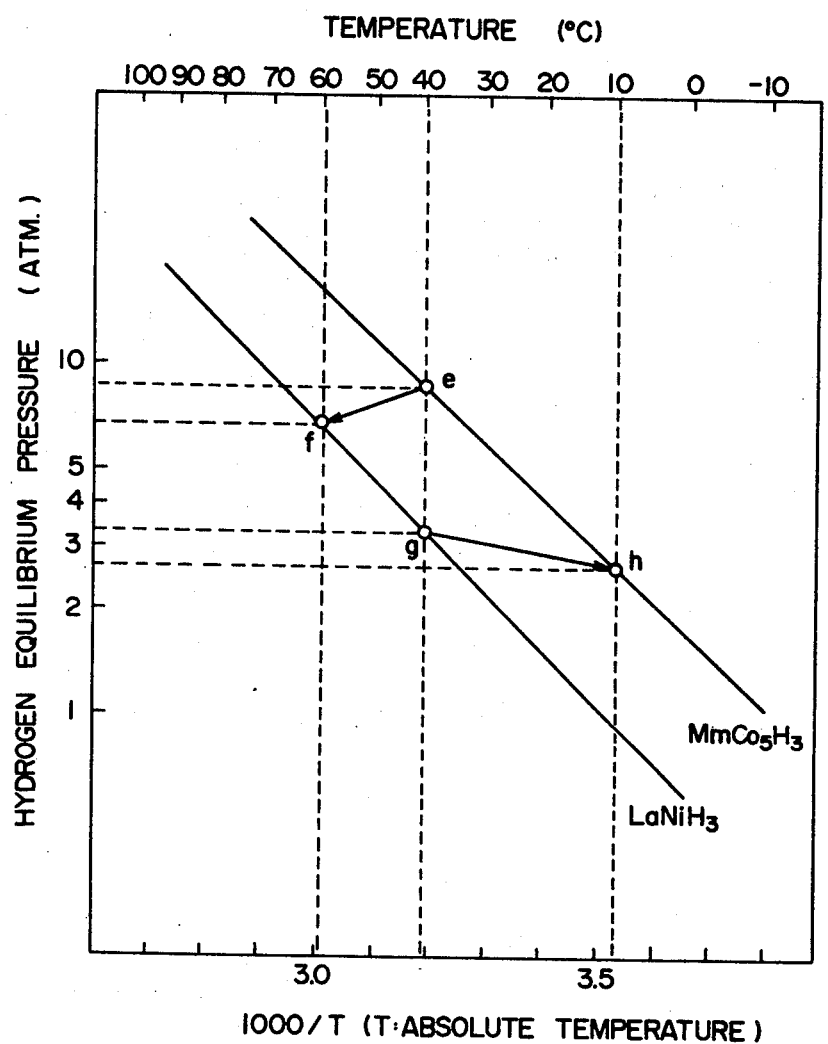
FIG. 11 is a graphic representation showing the hydrogen equilibrium pressures of mischmetal cobalt hydride (MmCo$_5$H$_3$) and lanthanum nickel hydride (LaNi$_5$H$_3$) as a function of temperature.

FIG. 8 is a sectional view of one embodiment of the metal hydride reactor used to perform heating, and the hydrogen equilibrium pressures of lanthanum nickel hydride (LaNiH$_3$) and mischmetal cobalt hydride (M$_m$Co$_5$H$_3$) as functions of temperature are shown in FIG. 11. Referring to FIG. 8, a sealed vessel 1 is of the same configuration as the vessel shown in FIG. 5. A metal hydride C is put in compartments 12 and 15 located outwardly of a cylindrical partitioning wall 22, and a metal hydride D is put in chambers 13 and 14 located inwardly of the partitioning wall 22. A heat exchanger shown at 30 is also of the same configuration as the heat exchanger 30 shown in FIG. 5. The solar heat collector 60 is connected to heat exchanging chambers 31 and 33 so that a heat transfer medium heated by the heat collected in the solar heat collector 60 may be circulated between the collector 60 and the heat exchanging chambers 31 and 33. The heat exchanging chamber 34 is connected to a blower 61 so as to supply the atmospheric air, and the heat exchanging chamber 32 is connected to a radiator 62.

Using the above-described system, heating can be performed in the following manner.

The metal hydride C (mischmetal cobalt hydride) is put in the chambers 12 and 15, and the metal hydride D (lanthanum nickel hydride) is put in the compartments 13 and 14. Let us suppose that the temperature of the heat transfer medium heated by the heat collected by the solar heat collector 60 is 40° C. and the temperature of the atmospheric air is 10° C. The mischemetal cobalt hydride in the chamber 12 is heated to 40° C. by the heat transfer medium heated by the solar heat collector 60 to release hydrogen gas. The released hydrogen gas is absorbed by the lanthanum nickel hydride in the compartment 13, whereupon the lanthanum nickel hydride generates heat and the reaction e→f (FIG. 11) proceeds. The heat generated in the compartment 13 is transmitted to the heat exchanging chamber 32 to heat the heat transfer medium in the exchanging chamber 32. The heated heat transfer medium is circulated to the radiator 62 for use in heating. Simultaneously, the mischmetal cobalt hydride in the compartment 15 is cooled by the atmospheric air, and the lanthanum nickel hydride in the compartment 14 is heated by the heat transfer medium heated by the solar heat collector 60. Thus, the reaction g→h (FIG. 11) proceeds in which hydrogen gas moves from the lanthanum nickel hydride to the mischmetal cobalt hydride. The sealed vessel 1 is rotated through 180° every time the reactions e→f and g→h substantially end. Thus, the heat exchanging chamber 32 is always heated, and heating is performed continuously.

FIG. 12 shows another embodiment of the metal hydride reactor of the invention used for cooling. Referring to FIG. 12, the reference numeral 1 represents a hollow cylindrical sealed vessel consisting of two concentrically arranged cylindrical planes having a central shaft 10 as a center and two planes perpendicular to the central shaft 10. The vessel 1 is rotatable about the central shaft 10. The sealed vessel 1 is divided into two sealed chambers by a sealing wall 20, FIG. 13(a) provided diametrically of the cylinder. Each of the sealed chambers is divided into two compartments by means of a partitioning wall 22 provided concentrically with the two cylindrical planes of the vessel 1. The partitioning wall 22 is permeable to hydrogen gas but impermeable to metal hydrides. The vessel 1 is thus divided into four compartments 16, 17, 18 and 19 by the sealing wall 20 and the partitioning wall 22. The outer cylindrical surface 26a of the vessel 1 acts as a heat conducting surface for the compartments 16 and 19, and the inner cylindrical surface 26b, a heat conducting surface for the compartments 17 and 18.

Outwardly of the outer cylindrical surface 26a of the vessel 1 is fixedly provided an outer heat exchanger 30a in hollow cylindrical form having a heat exchanging surface 27a facing the surface 26a. A cylindrical inner heat exchanger 30b having a heat exchanging surface 27b facing the surface 26b is disposed inwardly of the inner cylindrical surface 26b of the vessel 1. Each of the outer and inner heat exchangers is divided into two chambers by means of sealing walls 53 and 43 which are located on one plane including the central shaft 10 and extending diametrically. Thus, the outer heat exchanger is divided into chambers 41 and 42, and the inner heat exchanger, into chambers 51 and 52.

A metal hydride E is put in the compartments 16 and 19 of the sealed vessel 1, and a metal hydride F different from the metal hydride E, in the compartments 17 and 18.

Solar heat collector 60 is connected to the heat exchanging chamber 51 so that a heat transfer medium heated by the heat collected in the collector 60 circulates between the heat collector 60 and the chamber 51. Blower 61 is connected to the heat exchanging chambers 52 and 41 so as to supply the atmospheric air. Radiator 62 is connected to the heat exchanging chamber 42.

In performing cooling by means of the above-described system, iron titanium hydride as the metal hydride E and neodymium cobalt hydride as the metal hydride F are put in the respective compartments of the vessel 1, and the system is operated in the same way as explained hereinabove with reference to FIG. 5. This system can also be used for heating by connecting the solar heat collector 60, the blower 61 and the radiator 61 in the same way as described hereinabove with reference to FIG. 8.

In the embodiments shown in FIG. 6(a) and FIG. 13(a), the sealed vessel is divided by one diametrically extending sealing wall. If desired, it can be divided more by using two or more sealing walls. In the embodiment shown in FIG. 6(b), the vessel is divided into eight compartments 121, 121, 131, 131, 141, 141, 151 and 151 by means of two perpendicularly crossing sealing 201 and one partitioning wall 221. A metal hydride A is put in the compartments 131 and 141 located inwardly of the partitioning wall 221, and a metal hydride B, in the compartments 121 and 151 located outwardly of the partitioning wall 221.

In the embodiment shown in FIG. 13(b), the vessel 1 is divided into eight compartments 161, 161, 171, 171, 181, 181, 191 and 191 by means of two perpendicularly crossing sealing walls 211 and one partitioning wall 231. A metal hydride F is put in the compartments 171 and 181 located inwardly of the partitioning wall 231, and a metal hydride E, in the compartments 161 and 191 located outwardly of the partitioning wall 231.

When using the metal hydride reactor vessel divided into eight compartments as shown in FIG. 6(b) or 13(b), and the heat exchanger divided into four chambers as shown in FIG. 7(a) or 13(a), cooling or heating can be continuously performed by continuously rotating the reactor vessel at a substantially constant rate instead of intermittently rotating them through 180 degrees.

The heat exchangers may be divided so as to correspond to the metal hydride reactor vessels. FIGS. 7(b) and 13(b) are sectional views showing embodiments in which a heat exchanger is divided into eight chambers. In FIG. 7(b), the heat exchanger is divided into eight chambers 311, 311, 321, 321, 331, 331, 341 and 341 by means of two perpendicularly crossing sealing walls 361 and one cylindrical sealing wall 351, and in FIG. 13(b), the heat exchangers are divided into eight chambers 411, 441, 421, 421, 511, 511, 521 and 521 by means of two sealing walls 431 and two sealing walls 531.

When the same operation as that described hereinabove with reference to FIG. 5 is performed using the metal hydride reactor shown in FIG. 6(b) and the heat exchangers shown in FIG. 7(b), one cycle of a→b→c→d described above with reference to FIG. 10 can be completed by intermittently rotating the metal hydride reactor through 90° twice (therefore, through a total angle of 180°). Hence, the operation can be performed at a slower speed of rotation. By similarly performing 90° rotation twice using the metal hydride reactor and the heat exchangers which are shown in FIG. 13(b), one cycle of e→f→g→h (FIG. 11) can be completed.

Figure 9:
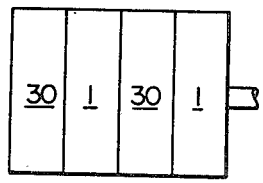
FIG. 9 is a side elevation showing a different embodiment of a system for cooling and heating by means of the metal hydride reactor of the invention.

In the embodiment shown in FIG. 9, a plurality of metal hydride reactor vessel 1, being cylindrical and having a heat conducting surfaces perpendicular to a central shaft therein, and heat exchangers 30 are alternately connected. According to this arrangement, the area of the heat conducting surface increases and therefore, the efficiency of operation becomes higher. Furthermore, by rotating the plurality of heat metal hydride reactors in different phases of rotation, it is possible to reduce fluctuations with time in the amount of heat emitted from the radiator so that a substantially constant emission of heat can always be obtained.

The heat exchangers described hereinabove are those divided into a plurality of chambers, but such division of a heat exchanger is not always necessary. It is sufficient that any heat exchanger has a heat exchanging surface corresponding to the heat conducting surface of the metal hydride reactor. In a chamber through which a heat transfer medium heated by the heat of the solar heat collector circulates or a chamber connected to a radiator, a pipe for a heat transfer medium may be provided on the heat exchanging surface, or the pipe may be used as the heat exchanging surface. The heat transfer medium may be any of those which are known, for example water, polyethylene glycol and silicone oils.

In the embodiments described hereinabove, air is blown by a blower for cooling purposes, and heat is collected by the solar heat collector for heating purposes. Alternatively, a cooling medium may be circulated for cooling purposes, and hot boiler waste water, steam, heated air, etc. may be circulated for heating purposes.

Figure 14:
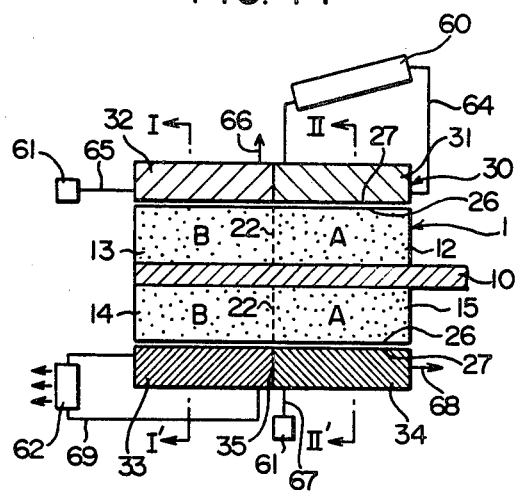
FIG. 14 is a sectional view showing another embodiment of a system for cooling by means of the metal hydride reactor of the invention.

FIGS. 14 and 15 show other air-conditioning systems in which the metal hydride reactor of the invention is used for cooling. In FIG. 14, a sealed vessel 1 as a metal hydride reactor is provided rotatably about a central shaft 10, and is of a cylindrical shape defined by one cylindrical plane about the central shaft 10 as a center and two planes perpendicular to the central shaft 10. In the embodiment shown in FIGS. 15(a) and 15(c), the sealed vessel 1 is divided into two sealed chambers by one sealing wall 20 diametrically extending in a plane including the shaft 10. Each of the sealed chambers is divided into two axially aligned compartments by a partitioning wall 22 which is permeable to hydrogen gas but impermeable to metal hydrides. Thus, four compartments 12, 13, 14 and 15 are formed by the sealing wall 20 and the partitioning wall 22. A metal hydride A is put in the compartments 12 and 15 located on the right of the partitioning wall 22 in FIG. 14, and a metal hydride B different from the metal hydride A, in the compartments 13 and 14 located on the left of the partitioning wall 22. A cylindrical outside surface 26 of the sealed vessel 1 constitutes a heat conducting surface for the compartments 12, 13, 14 and 15.

A hollow cylindrical heat exchanger 30 having a heat exchanging surface 27 opposite to the cylindrical outside surface 26 of the sealed vessel 1 is provided around the sealed vessel 1. As FIGS. 15(a) and (c) show, the heat exchanger 30 is divided into chambers 31, 32, 33 and 34 by a diametrically extending sealing wall 36 including the central shaft 10 and a sealing wall 35 (FIG. 14) which is located on the same plane as the partitioning wall 22 of the sealed vessel 1.

A solar heat collector shown at 60 is connected to the heat exchanging chamber 31 by a pipe 64 so that a heat transfer medium circulates between the heat collector 60 and the chamber 31. Blowers 61 and 62 are connected respectively to the heat exchanging chambers 32 and 34 by means of pipes 65 and 67 so that the atmospheric air passes through the heat exchanging chambers 32 and 34 and is discharged from discharge openings 66 and 68 provided in the chambers 32 and 34, respectively. A radiator 63 is connected to the heat exchanging chamber 33 by a pipe 69 so that a heat transfer medium circulates between the radiator 63 and the heat exchanging chamber 33.

Cooling by the above system is done in the following manner. Neodymium cobalt hydride as the metal hydride A and iron titanium hydride as the metal hydride B are put in the respective compartments of the sealed vessel 1. The hydrogen equilibrium pressures of the neodymium cobalt hydride ($NdCo_5H_3$) and the iron titanium hydride (FeTiH) as functions of temperature are shown in FIG. 10. Let us suppose that a heat transfer medium is heated to 80° C. by the heat collected by the solar heat collector 60, and the temperature of the atmospheric air is 30° C. The heat transfer medium heated by the solar heat collector 60 is circulated between it and the heat exchanging chamber 31. The heat of the heat transfer medium is conducted to the compartment 12 to heat the neodymium cobalt hydride. The atmospheric air is supplied to the heat exchanging chamber 32 by means of the blower 61 to maintain the heat exchanging chamber 32 at 30° C. The heat is conducted to the compartment 13, and the iron titanium hydride is maintained at 30° C. When the neodymium cobalt hydride is maintained at 80° C. (point a in FIG. 10), the hydrogen equilibrium pressure of the neodymium cobalt hydride reaches about 10 atmospheres. When the iron titanium hydride is maintained at 30° C. (FIG. 10, b), the hydrogen equilibrium pressure of the iron titanium hydride is about 5.5 atmospheres. Accordingly, the neodymium cobalt hydride releases hydrogen gas, and the iron titanium hydride absorbs it. In other words, the reaction a→b takes place between the compartments 12 and 13. When the reaction a→b substantially ends, the sealed vessel 1 is rotated through 180° about the central shaft 10 to bring the compartments 12 and 13 to positions facing the heat exchangers 34 and 33 respectively. The atmospheric air is supplied to the heat exchanging chamber 34 by means of the blower 62 to maintain the chamber 34 at 30° C., and the neodymium cobalt hydride in the compartment 12 is cooled to 30° C. (FIG. 10, d). When cooled to 30° C., the neodymium cobalt hydride has a hydrogen equilibrium pressure of about 1.2 atmospheres which is lower than the hydrogen equilibrium pressure of the iron titanium hydride in the compartment 13. Thus, the iron titanium hydride releases hydrogen gas, and neodymium cobalt hydride absorbs it. Upon releasing hydrogen gas, the iron titanium hydride absorbs heat, and is cooled in the direction b→c. A steady state is reached, for example at 5° C. (point c in FIG. 10), and the reaction c→d takes place. Since the compartment 13 is cooled to 5° C. at this time, the heat transfer medium in the heat exchanging chamber 33 opposite to the compartment 13 is cooled. The cooled heat transfer medium is circulated to the radiator 53 for use in cooling. When the reaction c→d is substantially over, the sealed vessel 1 is again rotated through 180°, and the neodymium cobalt hydride in the compartment 12 and the iron titanium hydride in the compartment 13 begin to react in the direction a→b.

The neodymium cobalt hydride is present in the compartments 12 and 15, and the iron titanium hydride, in the compartments 13 and 14. While the reaction a→b proceeds between the compartments 12 and 13, the reaction c→d takes place between the compartments 14 and 15. Conversely, when the reaction c→d proceeds between the compartments 12 and 13, the reaction a→b proceeds between the compartments 14 and 15. Accordingly, the reaction between the neodymium cobalt hydride and the iron titanium hydride is prescribed such that while the sealed vessel 1 rotates through 180°, the reaction between them proceeds through one cycle of a→b→c→d. Thus, continuous cooling can be performed since the compartments 13 or 14 of the vessel 1 facing the heat exchanging chamber 33 is always cooled.

Figure 16:
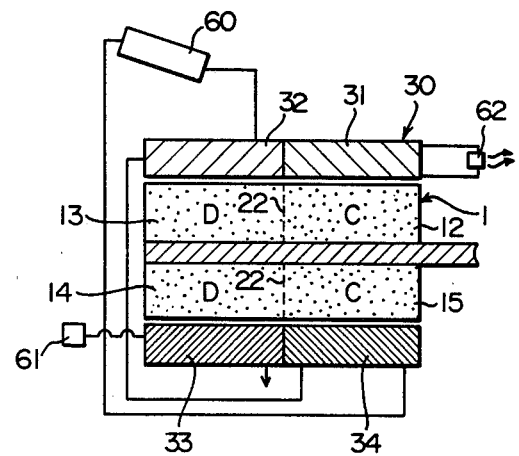
FIG. 16 is a sectional view showing still another embodiment of a system for heating by means of the metal hydride reactor of the invention.

FIG. 16 shows another heating system using the metal hydride reactor of the invention. The hydrogen equilibrium pressures of lanthanum nickel hydride ($LaNiH_3$) and mischmetal cobalt hydride ($M_mCo_5H_3$) as functions of temperature are shown in FIG. 11. In FIG. 16, the reference numeral 1 represents a sealed vessel as a metal hydride reactor which has the same shape as that shown in FIG. 14. A metal hydride C is put in compartments 12 and 15 located on the right of a partitioning wall 22 perpendicular to the central shaft, and metal hydride D, in compartments 13 and 14 on the left of the partitioning wall 22. A heat exchanger 30 having the same shape as the heat exchanger shown in FIG. 14 is provided around the vessel 1, and a solar heat collector 60 is connected to heat-exchanging chambers 32 and 34 of the heat exchanger 30 as to circulate a heat transfer medium heated by the heat collected by the solar heat collector 60. A blower 61 is connected to a heat exchanging chamber 33 to supply the atmospheric air, and a radiator 63 is connected to a heat exchanging chamber 31. In operation, lanthanum nickel hydride as the metal hydride C is put in the compartments 12 and 15, and mischmetal cobalt hydride as the metal hydride D is put in the compartments 13 and 14. Let us suppose that the temperature of a heat transfer medium heated by the heat collected in the solar heat collector 60 is 40° C., and the temperature of the atmospheric air is 10° C. The mischmetal cobalt hydride in the compartment 13 is heated to 40° C. by the heat transfer medium heated by the solar heat collector 60 to release hydrogen. The released hydrogen is absorbed by the lanthanum nickel hydride in the compartment 12. Thus, the lanthanum nickel hydride generates heat, and the reaction e→f (FIG. 11) takes place. The heat generated in the compartment 12 is conducted to the heat exchanging chamber 31 to heat the heat transfer medium in the heat exchanging chamber 31. The heated heat transfer medium is circulated to the radiator 63 for use in heating. Meanwhile, in the compartment 14, the mischmetal cobalt hydride is cooled by the atmospheric air, and the lanthanum nickel hydride in the compartment 15 is heated by the heat transfer medium heated by the solar heat collector 60. As a result, hydrogen gas moves from the lanthanum nickel hydride to the mischmetal cobalt hydride and the reaction g→h (FIG. 11) takes place. When the sealed vessel 1 is rotated through 180° every time the reactions e→f and g→h are substantially over, the heat exchanging chamber 31 is always heated. Consequently, heating is carried out continuously by this system.

Figure 17:
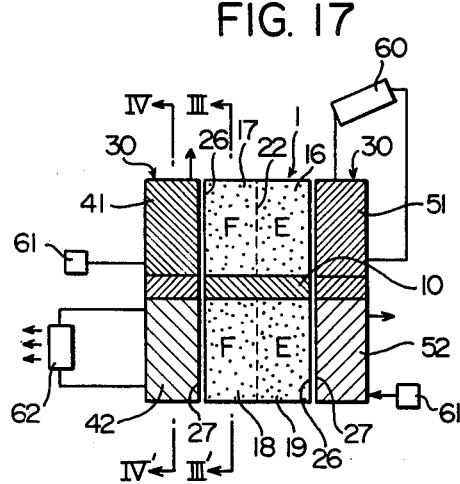
FIG. 17 is a sectional view showing a different embodiment of a system for cooling and heating by means of the metal hydride reactor of the invention.
Figure 18A:
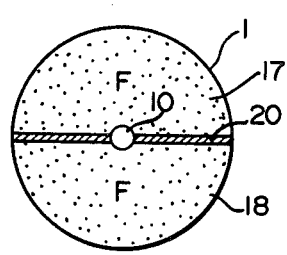
FIGS. 18(a) and (c) are sectional views taken along lines III-III' and IV-IV', respectively, of FIG. 17.

FIG. 17 shows another cooling system using the metal hydride reactor of the invention. FIG. 18(a) is a sectional view taken along line III—III' of FIG. 17, and FIG. 18(c) is a sectional view taken along line IV—IV' of FIG. 17. A sealed vessel 1 as a metal hydride reactor shown in these drawings is of a cylindrical shape about a shaft 10, but differs from the sealed vessels shown in FIGS. 14 and 16 in that it includes planes 26 perpendicular to the central shaft which serve as heat conducting surfaces. The vessel 1 is divided into four compartments 16, 17, 18 and 19 by a sealing wall 20 and a partitioning wall 22. Two heat exchangers 30 having a heat exchanging surfaces 27 facing the heat conducting surfaces 26 of the sealed vessel are fixedly provided on both sides of the vessel 1. Each of the heat exchangers 30 is divided into chambers 41 and 42 or 51 and 52, respectively, by means of diametrically extending partitioning walls 43, including the shaft 10.

Referring to FIG. 17, a metal hydride E is put in the compartments 16 and 19 located on the right of the partitioning wall 22, and a metal hydride F different from the metal hydride E, in the compartments 17 and 18 located on the left of the partitioning wall 22. As in the other embodiments, a solar heat collector 60 is connected to heat exchanging chamber 51 so as to circulate a heat transfer medium heated by the heat collected by the solar heat collector 60. Blowers 61 and 62 are connected respectively to heat exchanging chambers 52 and 41 to supply the atmospheric air. Radiator 63 is connected to the heat exchanging chamber 42. In operation, neodymium cobalt hydride as the metal hydride E and iron titanium hydride as the metal hydride F are put in the respective compartments of the sealed vessel 1, and by operating in the same way as described with reference to FIG. 14, cooling can be performed. Alternatively, the above system may be used for heating by connecting the solar heat collector 60, the blowers 61 and 62 and the radiator 63 in the same manner as described hereinabove with reference to FIG. 16.

Figure 15A:
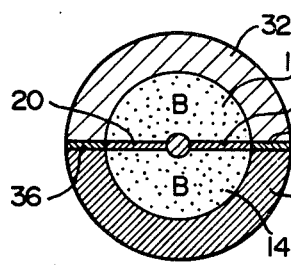
FIGS. 15(a) and 15(c) are sectional views taken alone lines I-I' and II-II', respectively, of FIG. 14.
Figure 15B:
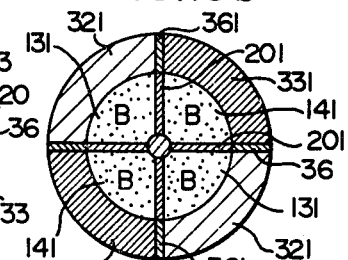
FIGS. 15(b) and 15(d) are sectional views showing different embodiments taken along lines I-I' and II-II', respectively, of FIG. 14.
Figure 15C:
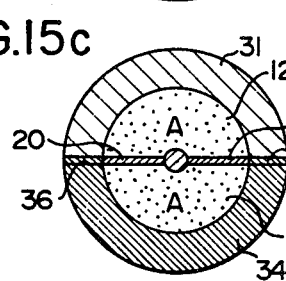
Figure 15D:
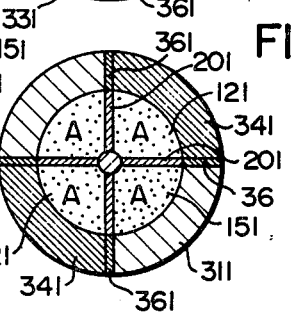

Now, referring to FIGS. 15(b) and 15(d), the metal hydride reactor vessel 1 is divided into eight compartments 121, 121, 131, 131, 141, 141, 151 and 151 by one partitioning wall 22 (FIG. 14) and two perpendicularly crossing sealing walls 201. A metal hydride A is put in the compartments 121 and 151 located on the right of the partitioning wall 22 and a metal hydride B, in the compartments 131 and 141 located on the left of the wall 22.

Figure 18B:
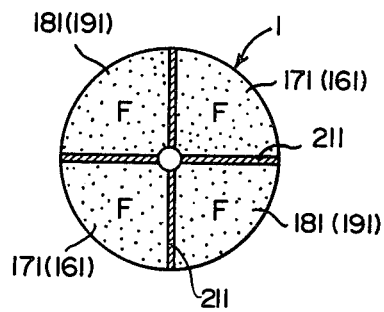
FIGS. 18(b) and 18(d) are sectional views showing different embodiments taken along lines III-III' and IV-IV', respectively, of FIG. 17.
Figure 18C:
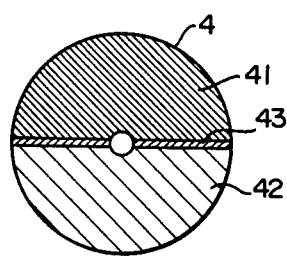

In the embodiment shown in FIG. 18(b), eight compartments 161, 161, 171, 171, 181, 181, 191 and 191 are provided by a partitioning wall 22 (FIG. 17) and sealing walls 211. A metal hydride F is put in the compartments 171 and 181 located on the left of the partitioning wall 22, and a metal hydride E, in the compartments 161 and 191 located on the right thereof.

Cooling or heating can be performed substantially continuously by using a metal hydride reactor having eight compartments as shown in FIGS. 15(b) and (d) and FIG. 18(b) in combination with a heat exchanger having four chambers as shown in FIGS. 15(a) and 15(c) and FIG. 18(c) and substantially continuously rotating the metal hydride reactor.

Figure 18D:
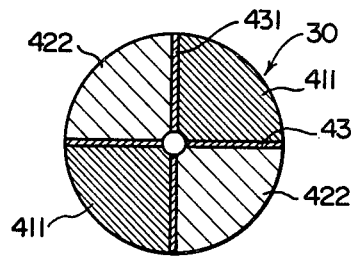

Alternatively, the heat exchanger may be divided correspondingly to the metal hydride reactor vessel having eight compartments. An example of such a heat exchanger is shown in FIGS. 15(b) and 15(d) and FIG. 18(d). Referring to FIGS. 15(b) and 15(d), the heat exchanger is divided into eight chambers 311, 311, 321, 321, 331, 331, 341, and 341 by means of a sealing wall 35 (FIG. 14) and perpendicularly crossing sealing walls 36 and 361. In the embodiment shown in FIG. 18(d), the heat exchanger 30 is divided into four chambers 411, 411, 421 and 421 by perpendicularly crossing sealing walls 43 and 431, and the other heat exchanger 30 opposite to the first one has four chambers as a result of division in the same way. If the metal hydride reactor and heat exchanger shown in FIGS. 15(b) and 15(d) or the metal hydride reactor and heat exchanger shown in FIGS. 18(b) and 18(d) are operated in the same as described hereinabove with reference to FIG. 14, and the metal hydride reactor is intermittently rotated through 180° by rotating it through 90° twice, one cycle of a→b→c→d (FIG. 10) or e→f→g→h (FIG. 11) can be completed and the speed of rotation can be decreased.

Figure 19:
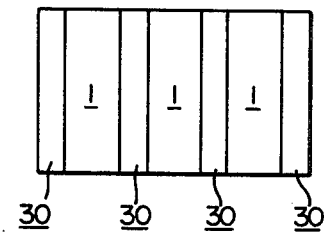
FIG. 19 is a side elevation showing a different embodiment of a system for cooling and heating by means of the metal hydride reactor of the invention.

Alternatively, it is possible to connect a plurality of cylindrical metal hydride reactors and heat exchangers of the type shown in FIG. 17 alternately as shown in FIG. 19 in which the reference numeral 1 represents the metal hydride reactors and the reference numeral 30 represents the heat exchangers. This arrangement increases the area of the heat conducting surface and therefore the efficiency of operation. Furthermore, by rotating the metal hydride reactors in different phase of rotation, the amount of heat emitted from the radiator can be maintained constant without fluctuation with time.

Figure 21:
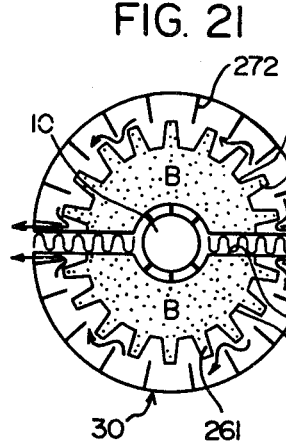
FIG. 21 is a sectional view taken along line II-II' of FIG. 20.
Figure 20:
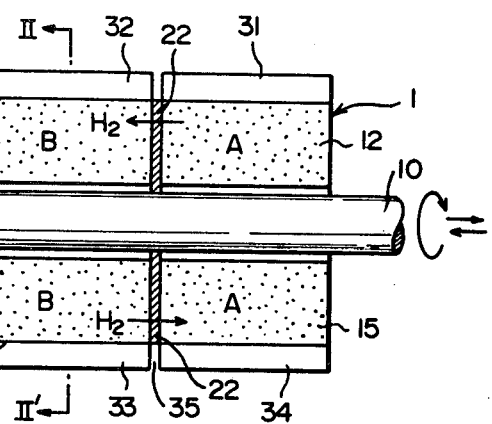
FIG. 20 is a sectional view showing yet another embodiment of the metal hydride reactor of the invention in conjunction with a heat exchanger.

Still another embodiment of the metal hydride reactor of the invention is shown in FIGS. 20 and 21. Referring to FIGS. 20 and 21, a sealed vessel 1 as a metal hydride reactor provided rotatably about a central shaft 10 is divided into two chambers by a substantially diametrically extending sealing wall 20 including the central shaft 10. Each of the chambers is partitioned into two compartments by a partitioning wall 22 permeable to hydrogen gas but impermeable to metal hydrides and extending along a plane perpendicularly crossing the central shaft 10, thus forming compartments 12, 13, 14 and 15. A peripheral surface 26 of the vessel 1 which constitutes a heat conducting surface has provided thereon a plurality of radially extending protrusions 261. Each of the protrusions 261 extends substantially parallel to the shaft 10, and for the reason to be described, is tapered axially (for example, a taper with a gradient of about 3/100) from its one end toward the other. The vessel 1 is axially movable together with the shaft 10.

A heat exchanger 30 is provided fixedly around the sealed vessel 1. A heat exchanging surface 27 of the heat exchanger 30 has a plurality of recesses 271 which have a shape corresponding to the protrusions 261 of the sealed vessel 1 for connection therewith. The recesses 271 are also tapered axially so as to conform to the protrusions 261. In contacting the heat conducting surface 26 of the vessel 1 with the heat exchanging surface 27 of the heat exchanger 30, contacting of the tapered protrusions 261 and the tapered recesses 271 can be made firmer by slightly moving the vessel 1 axially. The heat exchanger 30 is divided into four chambers 31, 32, 33 and 34 by a diametrically extending sealing wall 36 including the central shaft and a sealing wall 35 located on the same plane as the partitioning wall 22.

Rotation of the vessel 1 about the shaft 10 is effected after its engagement with the heat exchanger 30 has been released by moving the sealed vessel 1 axially. After rotating the vessel 1 through 180°, it is moved in a direction opposite to the axial direction to engage it again with the heat exchanger. The heat exchanger 30 has provided therein a plurality of baffle plates 272 upstanding inwardly from the outer wall of the heat exchanger 30, and the flow of a heat transfer medium is controlled by the baffle plates and the aforesaid recesses.

The vessel 1 and the exchangers 30 are made of stainless steel, and their outer walls excepting the heat conducting and heat exchanging surfaces are thermally insulated by a heat insulating material such as urethane foam. The partitioning wall 22 is made of a porous sintered stainless steel plate.

Cooling by means of the metal hydride reactor shown in FIGS. 20 and 21 is performed in the following manner.

Figure 22:
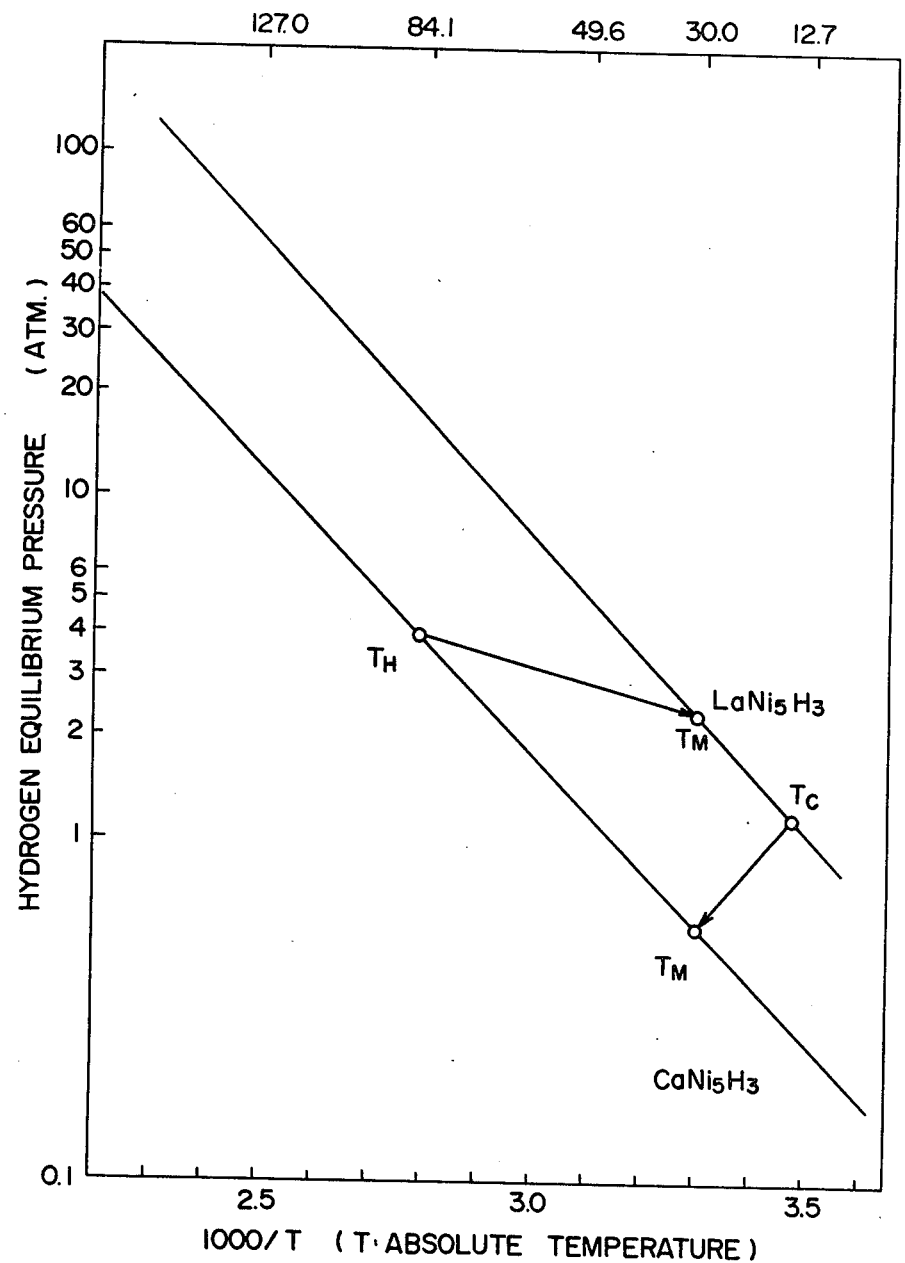
FIG. 22 is a graphic representation showing the hydrogen equilibrium pressures of lanthanum nickel hydride (LaNi$_5$H$_3$) and calcium nickel hydride (CaNi$_5$H$_3$) as functions of temperature.

$LaNi_5H_3$ is put in the compartments 13 and 14 of the vessel 1, and $CaNiH_3$, in the compartments 12 and 15. The hydrogen equilibrium pressures of $LaNi_5H_3$ and $CaNi_5H_3$ as functions of temperature are shown in FIG. 22.

A heat transfer medium kept at a temperature $T_M°C$. is supplied to the chambers 32 and 34 of the exchanger to cool $LaNi_5H_3$ and $CaNi_5H_3$ respectively. Furthermore, a heat transfer medium kept at a temperature $T_H°C$. is supplied to the chamber 31 of the heat exchanger to heat $CaNi_5H_3$. The calcium nickel hydride in the compartment 12 of the vessel 1 releases hydrogen into the compartment 13 and the lanthanum nickel hydride in the compartment 13 absorbs the hydrogen. On the other hand, the lanthanum nickel hydride in the compartment 14 releases hydrogen into the compartment 15. Thus, the heat of a temperature $T_c°C$. is obtained in the chamber 33 of the heat exchanger which is in contact with the compartment 14.

The above reaction is stopped at the end of 20 minutes, and the sealed vessel 1 is pulled out axially to disengage it from the heat exchanger 30. Then, the sealed vessel 1 is rotated through 180°, and is again brought into engagement with the heat exchanger 30.

Thus, the compartment 15 of the vessel 1 is heated to $T_H°C$. by the chamber 31 of the heat exchanger, and compartment 14 is cooled to $T_M°C$. by the chamber 32 of the heat exchanger. The calcium nickel hydride in the compartment 15 releases hydrogen, and the lanthanum nickel hydride in the compartment 14 absorbs hydrogen. Furthermore, the compartment 12 is cooled to $T_M°C$. by the heat-exchanging chamber 34. As a result, the lanthanum nickel hydride in the compartment 13 releases hydrogen which is absorbed by the calcium nickel hydride in the compartment 12. As a result, the heat of $T_c°C$. is obtained in the heat exchanging chamber 33. The above reaction is stopped at the end of 20 minutes, and the vessel 1 is again rotated through 180°, followed by repeating the reaction. Thus, the heat of $T_c°C$. is obtained continuously from the heat exchanging chamber 33.

If the above operation is carried out by using the compartments 12, 13, 14 and 15, each having a capacity of 0.5 liter and a heat conducting area of about 0.03 $m^2$, and putting 2 kg of $LaNi_5H_3$ in the compartments 13 and 14 and 2 kg of $CaNi_5H_3$ in the compartments 12 and 15, an output of about 10 Kcal/20 minutes is obtained continuously in the heat exchanging chamber 33.

Figure 23:
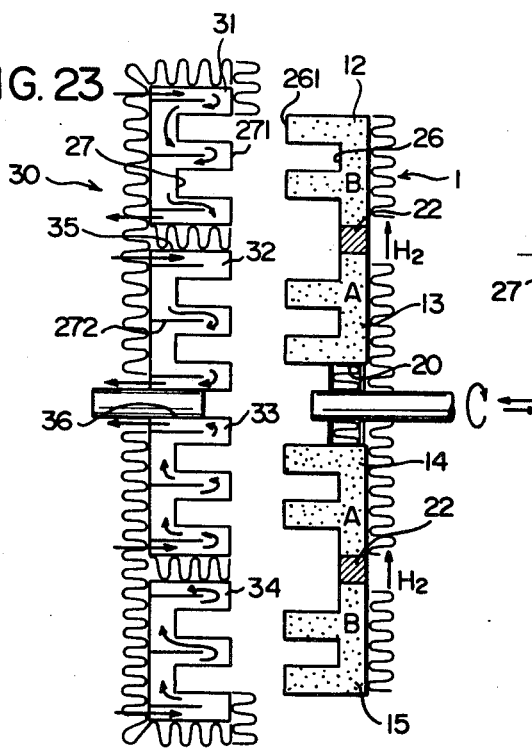
FIG. 23 is a sectional view showing yet another embodiment of the metal hydride reactor of the invention in combination with a heat exchanger.

FIG. 23 shows yet another example of the metal hydride reactor of the invention. A cylindrical sealed vessel 1 as a metal hydride reactor provided rotatably about a central shaft 10 is divided into two chambers by a substantially diametrically extending sealing wall 20. Each of the chambers is further divided into two compartments by an annular partitioning wall 22 around the shaft 10 as a center, thus providing compartments 12, 13, 14 and 15. The partitioning wall 22 is made of a material permeable to hydrogen gas but impermeable to metal hydrides. One surface 26 of the vessel 1 which serves as a heat conducting surface has provided therein two semi-annular protrusions 261 for each of the four compartments, thereby increasing the area of the heat conducting surface. The vessel 1 is reciprocable axially together with the shaft 10.

Figure 24:
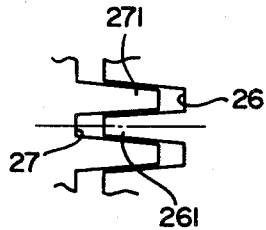
FIG. 24 is an enlarged sectional view showing a contacting part between the metal hydride reactor and the heat exchanger shown in FIG. 23.

A heat exchanger 30 is fixedly provided opposite to the heat conducting surface 26 of the vessel 1. The heat exchanger 30 is divided into four chambers 31, 32, 33 and 34 by a diametrically extending sealing wall 36 and an annular sealing wall 35 located on the same plane as the partitioning wall 22. A heat exchanging surface 27 of the heat exchanger 30 has provided therein a plurality of protrusions 271 engageable with the plurality of the annular protrusions 261 of the vessel 1. FIG. 24 shows on an enlarged scale the state of engagement of the heat conducting surface 26 of the vessel 1 with the heat exchanging surface 27 of the heat exchanger 30. The protrusions 261 are fitted into recesses existing among the protrusions 271 whereby both are kept in contact with each other. The protrusions 261 and the recesses on the heat-exchanging surface 27 are each tapered, and by moving the protrusions 261 to the recesses, firm contact between the protrusions 261 and 271 can be achieved. Rotation of the vessel 1 about the shaft 10 is effected after it is moved away from the heat exchanger 30. For example, after rotating the vessel 1 through 180°, the vessel 1 is again brought into engagement with the heat exchanger 30.

A plurality of baffle plates 272 upstanding inwardly from the outer wall of the heat exchanger 30 are provided so as to control the flow of a heat transfer medium by the baffle plates 272 and the protrusions 271.

The vessel 1 and the heat exchanger 30 are made of stainless steel, and their outside walls other than the heat conducting surface and the heat exchanging surface are thermally insulated by a heat insulating material such as a urethane foam. The partitioning wall 22 is made of a sintered stainless steel plate.

The system shown in FIG. 23 is operated for cooling purposes by adjusting the inner capacity of each of the compartments 12, 13, 14 and 15 to 0.5 liter and putting 2 kg of $NaNi_5$ in the compartments 12 and 15 and 2 kg of $CaNi_5$ in the compartments 13 and 14. The heat conducting area of each of the compartments is set at about 0.03 $m^2$, and water is used as a heat transfer medium. The vessel 1 is rotated through 180° every 20 minutes. As a result, an output of about 10 Kcal/20 minutes is continuously obtained at the heat exchanging chamber 34.

Basically, the metal hydride reactor of this invention, as described hereinabove, consists of a sealed chamber divided into two compartments by a partitioning wall made of a material which is permeable to hydrogen gas but impermeable to metal hydrides, and different metal hydrides are sealed in the respective compartments. Hence, the configuration of the metal hydride reactor is simple, and no pipe for hydrogen flowing between the compartments is required. The metal hydride reactor of the invention thus has excellent hydrogen gas sealability and pressure resistance is very safe and can be easily produced at low cost. Furthermore, since there is no pipe, valve, electromagnetic valve or similar element between the compartments containing different metal hydrides, hydrogen gas released from one metal hydride is absorbed by the other metal hydride without substantial pressure losses, and the efficiency of the reaction is excellent. Because of these advantages, the metal hydride reactor of the invention can be used conveniently in continuous heating and cooling systems, similar systems.

According to another aspect, heating or cooling can be continuously and easily performed by rotating the metal hydride reactor of the invention consisting of compartments containing different metal hydrides about a rotating shaft, successively performing heat exchange between the respective compartments of the metal hydride reactor and the respective chambers of a heat exchanger. Heat exchange is carried out by utilizing the endothermic reaction or exothermic reaction of the metal hydrides which takes place at this time, and cooling or heating can be done by utilizing the heat generated or absorbed at this time. Moreover, this system is also easily maintained.

The metal hydride reactor of this invention also has a good heat efficiency because its heat conducting surface can be easily increased.

What we claim is:

1. A metal hydride reactor comprising a central shaft, a sealed vessel rotatable about said central shaft, said sealed vessel including at least one sealing wall and being divided into a plurality of sealed chambers by said at least one sealing wall along a plane containing said central shaft and extending diametrically thereof, and a plurality of partitioning walls, each of said plurality of sealed chambers having located therein one of said plurality of partitioning walls dividing said each of said plurality of sealed chambers into two compartments aligned in the direction of said central shaft, said partitioning wall extending along a plane crossing said central shaft and being made of a material permeable to hydrogen gas but impermeable to metal hydrides, said two compartments containing different metal hydrides, and said two compartments each having a heat conducting surface facing exteriorly thereof.

2. A metal hydride reactor as in claim 1, wherein said sealed vessel comprises only one sealing wall dividing said sealed vessel into two sealed chambers along a plane containing said central shaft and extending diametrically thereof.

3. A metal hydride reactor as in claim 1, wherein said at least one sealing wall comprises two sealing walls dividing said sealed vessel into four sealed chambers, extending along two perpendicularly crossing planes containing said central shaft and extending diametrically thereof.

4. A metal hydride reactor as in claim 1, claim 2, or claim 3, wherein said sealed vessel further comprises a chamber wall having a wall portion surrounding said central shaft and two generally planar wall portions crossing said central shaft, said surrounding wall portion forming said heat conducting surface of each of said two compartments of each of said plurality of sealed chambers.

5. A metal hydride as in claim 4, wherein said surrounding wall portion comprises a cylindrical wall portion having a center axis, said central shaft extending along said center axis, said two generally planar wall portions extending perpendicularly to said central shaft.

6. A metal hydride reactor as in claim 1, wherein said heat conducting surface of each of said two compartments has provided thereon a plurality of heat conducting protrusions extending parallel to said central shaft.

7. A metal hydride reactor as in any one of claims 1, 2, 3, and 6, further comprising a heat exchanger having a heat exchanging surface opposite, and in proximity to, said heat conducting surface of each of said two compartments of each of said plurality of sealed chambers, said heat exchanging surface being divided and shaped to match the shape of the heat conductive surface of each of the two compartments of each of said plurality of sealed chambers.

8. A metal hydride reactor as in claim 4, wherein said surrounding wall portion comprises axially spaced inner and outer cylindrical wall portions having a common center axis, said central shaft extending along said center axis, said two generally planar wall portions extending generally perpendicularly to said central shaft.

9. A metal hydride reactor as in claim 8, further comprising two heat exchangers, one of said two heat exchangers having a heat exchanging surface opposite, and in proximity to, said inner cylindrical wall portion, and the other of said two heat exchangers having a a heat exchanging surface opposite, and in proximity to, said outer cylindrical wall portion, said inner and outer cylindrical wall portions respectively forming inner and outer heat conducting surface portions of said heat conducting surface of each of said two compartments of each of said plurality of sealed chambers.

10. A metal hydride reactor as in claim 1, claim 2 or claim 3, wherein said sealed vessel further comprises a chamber wall having a wall portion surrounding said central shaft and two generally planar wall portions crossing said central shaft forming said heat conducting surface of each of said two compartments of each of said plurality of sealed chambers.

11. A metal hydride reactor as in claim 10, wherein said surrounding wall portion comprises a cylindrical wall portion having a center axis, said central shaft extending along said center axis, said two generally planar wall portions extending perpendicularly to said central shaft.

12. A metal hydride reactor as in claim 11, wherein said heat conducting surface of each of said two compartments has provided thereon a plurality of heat conducting protrusions subsantially concentrically aligned about said central shaft.

13. A metal hydride reactor as in claim 11, further comprising two heat exchangers each having a heat exchanging surface opposite, and in proximity to, respective ones of said two generally planar wall portions.

14. A metal hydride reactor for heating and/or cooling comprising a sealed chamber wall surrounding a sealed chamber; a partitioning wall dividing said sealed chamber into two compartments, said partitioning wall being made of a material permeable to hydrogen gas and impermeable to metal hydrides, said two compartments containing different metal hydrides; and means for effecting temperature changes in said two compartments such that the temperatures of said two compartments differ from each other.

15. A metal hydride reactor as in claim 14, wherein at least a part of said chamber wall is made of stainless steel.

16. A metal hydride reactor as in claim 14, wherein said material comprises a porous sintered body of metal.

17. A metal hydride reactor as in claim 14, wherein each of said two compartments comprises a heat conducting surface facing exteriorly thereof, the temperatures of said two compartments being changed by said temperature changes effecting means through said heat conducting surface.

18. A metal hydride reactor as in claim 14 or claim 17 wherein said partitioning wall comprises means for heat-insulating said two compartments from each other.

19. A metal hydride reactor comprising:
a central shaft; and a sealed vessel rotatable about said central shaft, said sealed vessel including at least one sealing wall dividing said sealed vessel into a plurality of sealed chambers, each of said at least one sealing wall extending along a plane containing said central shaft and extending diametrically thereof;

each of said plurality of sealed chambers comprising a partitioning wall dividing said each of said plurality of sealed chambers into two compartments, said partitioning wall being made of a material permeable to hydrogen gas and impermeable to metal hydrides, said two compartments containing different metal hydrides, and each of said two compartments having a heat conducting surface facing exteriorly thereof;

and means for effecting temperature changes in said two compartments such that the temperatures of said two compartments differ from each other.

20. A metal hydride reactor as in claim 19, wherein said sealed vessel comprises only one sealed wall dividing said sealed vessel into two sealed chambers along a plane containing said central shaft and extending diametrically thereof.

21. A metal hydride reactor as in claim 19 wherein said at least one sealing wall comprises two sealing walls dividing said sealed vessel into four sealed chambers, extending along two perpendicularly crossing planes containing said central shaft and extending diametrically thereof.

22. A metal hydride reactor as in claim 19, claim 20 or claim 21, wherein said sealed vessel further comprises a chamber wall having a wall portion surrounding said central shaft and two generally planar wall portions crossing said central shaft, at least one of said generally planar wall portions forming said heat conducting surface of each of said two compartments.

23. A metal hydride reactor as in claim 22, wherein said surrounding wall portion comprises a cylindrical wall portion having a center axis, said central shaft extending along said center axis, said two generally planar wall portions extending perpendicularly to said central shaft.

24. A metal hydride reactor as in claim 19, wherein said heat conducting surface of each of said two compartments has provided thereon a plurality of heat conducting protrusions substantially concentrically aligned about said central shaft.

25. A metal hydride reactor as in any one of claims 17, 20, 21 and 24, further comprising a heat exchanger having a heat exchanging surface opposite, and in proximity to, said heat conducting surface of each of said two compartments, said heat exchanging surface being divided and shaped to match the shape of said heat conductive surface of each of said two compartments located opposite thereto.

26. A metal hydride reactor as in claim 22, wherein said surrounding wall portion comprises concentric, axially spaced, inner and outer cylindrical wall portions having a common center axis, said central shaft extending along said center axis, said two generally planar wall portions extending perpendicularly to said central shaft.

27. A metal hydride reactor as in claim 26, further comprising two heat exchangers, one of said two heat exchangers having a heat exchanging surface opposite, and in proximity to, said inner cylindrical wall portion, and the other of said two heat exchangers having a heat exchanging surface opposite, and in proximity to, said outer cylindrical wall portion.

* * * * *